May 15, 1928. 1,669,891
J. D. BATES
ANTISKID DEVICE
Filed Nov. 30, 1923
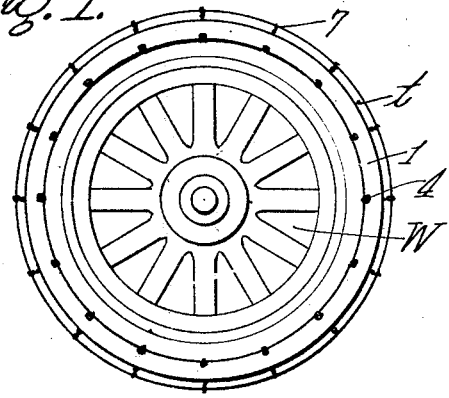
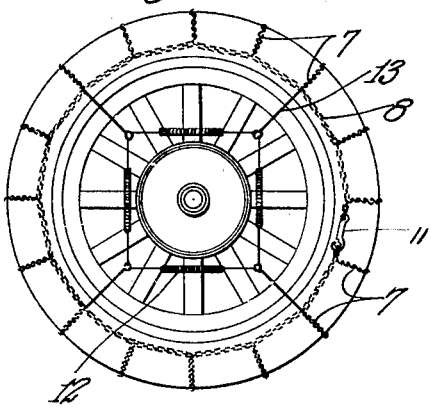
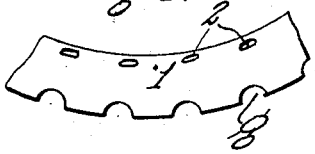
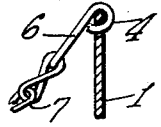
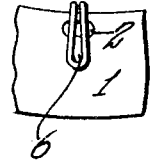
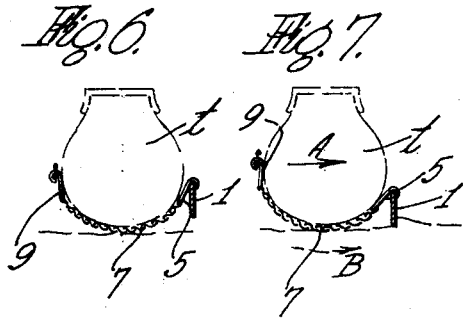
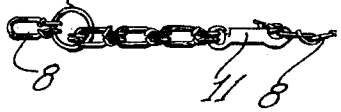
INVENTOR
Joseph D. Bates
BY Chapin & Neal
ATTORNEYS Patented May 15, 1928.

1,669,891

UNITED STATES PATENT OFFICE.

JOSEPH D. BATES, OF WEST SPRINGFIELD, MASSACHUSETTS.

ANTISKID DEVICE.

Application filed November 30, 1923. Serial No. 677,846.

This invention relates to improvements in anti-skid devices for vehicle wheels and more particularly a device adapted for use in connection with automobiles.

Many anti-skid chains now used on automobiles are at times and under certain condition more liable to cause skidding than to prevent it. This is due to the fact that the cross chains become highly polished and smooth, and as the rear end of an automobile swerves to the right or left the chains act in the nature of a skid or runner and tend to accelerate the swerving motion. Such cross chains while effectual in stopping a straight line forward or reverse sliding movement, are very ineffectual in retarding a lateral skidding.

One object of my invention is the provision of means for preventing the side swerving and skidding action of an automobile and is accomplished by providing suitable roadway engaging members that tend to positively increase their biting action on the roadway accordingly as the tendency to swerve is increased. A further object is the provision of a device that may be easily and quickly applied to a wheel and tire and that possesses durability and strength.

Other objects and advantages will appear from the following description and accompanying drawings. It will be understood that the form of the invention to be disclosed is merely for the purposes of description and that scope of the invention is not to be limited thereby.

Fig. 1 is a side elevational view of a vehicle wheel showing my anti-skid device applied thereto;

Fig. 2 is the other side elevational view of the same;

Fig. 3 is an enlarged elevational view showing a section of the anti-skid ring in a modified form;

Fig. 4 is an enlarged cross-section through the ring showing the method of pivotally connecting the cross chains thereto;

Fig. 5 is a side elevational view of the same;

Figs. 6 and 7 are diagrammatic cross sectional views showing the relative positions of the device in action; and Fig. 8 is an elevational view showing the side chain fastening means.

In the drawing, 1 represents an anti-skid ring-like member preferably of strong rigid material such as steel or other metal. The said ring has an outer periphery preferably less in diameter than the tread of the tire $t$ while its thickness is considerably less than its width, so as to present a narrow edge for engagement with the road as hereinafter described. Rings of any desired relative width and thickness may be employed and their selection will be governed principally by the uses for which they are to be employed. Elongated apertures are provided adjacent the inner edge or periphery of the ring 1 that are adapted to receive the eye portions 4 of the cross chain hooks 5. The said hooks 5 are preferably of the type commonly used in connection with anti-skid chains and as shown in Figs. 4 and 5 comprise an eye portion 4 and a loop 6 that are adapted to receive the end links of cross chains 7.

A side member preferably a flexible chain 8 is adapted to overlie the side of the tire opposite the ring member 1 as shown. Cross members preferably flexible chains 7 are connected to the loops 6 of the hooks 5 and to the side chain 8 in the usual manner by the means of hooks 9 that may be similar to the hooks 5. One end of the side chain 8 is provided with a ring 10 while its other end carries a halter snap or hook 11. The chain 8 is sufficiently long so that its end carrying the snap 11 may be passed through the ring 10 and the chain end doubled back upon itself as show in Fig. 8. When thus doubled back the snap may detachably engage any one of its links. This fastening arrangement I have found to be of great advantage as I am able to adjust the said chain as may be desired to make it either slack or taut. The cross chains 7 and side chain 8 are preferably designed and adjusted so that when in place upon a tire they cooperate in such a manner that the ring 1 is normally supported concentrically to the tire and wheel and away from the roadway. The connecting cross chains 7 loosely embrace the tire tread and are capable of a shifting movement transversely of the tire, later to be described.

A spring tension arrangement best shown in Fig. 2 may be employed to hold the chains yieldingly in place and as will be seen may comprise coil springs 12 that are connected to the side chain 8 by the usual rods 13. Any other method or type of spring arrangement desired may be used. It may be desirable to provide the rigid ring 1 in sections that are hinged together to facilitate the same being folded together to form a compact package. This may be accomplished by providing suitable hinges and pintles and the necessary locking mechanism to retain the ring rigidly in its open unfolded position.

It may be desirable to roughen or so shape the periphery of the ring member 1 to adapt it to exert a more effective biting action upon the roadway, and this may be accomplished by providing semi-circular grooves 9 in the periphery of the ring 1 as shown in Fig. 3. This, or any other means desirable may be employed to roughen or break the even peripheral edge, and its desirability will be governed by the uses for which the device is to be employed.

In operation, the device is applied to the wheel of an automobile with the rigid member 1 preferably on the outer and the side chain 8 on the inner side of the wheel tire. The side chain is preferably adjusted so that the cross chains may easily slide transversely over the tread of the tire. When so adjusted the said chains hold the ring member 1 in a concentric relation with respect to the tire and as will be noted with its periphery normally out of contact with the roadway or ground. In this position and as shown in Fig. 6, the cross chains function as usual to aid in obtaining proper traction and to retard a forward or reverse skidding movement of the tire. In preventing a swerving movement to the side as illustrated in Fig. 7, the device operates as follows: As the tire skids or moves as by sliding on the roadway in the direction of arrow A, its tread has a tendency to ride upon the cross chain 7 toward the right. This effective movement pulls the ring 1 downwardly and its periphery bites into the roadbed as shown in Fig. 7. When the said ring thus engages the roadbed, a further thrust or skidding action of the wheel tends to continue the transverse movement of the cross chains and a continuous downward movement is imparted to the ring to cause it to increase its biting action.

With the ring thus engaging the roadway, it will be seen that the ring is caused to exert its non-skidding action in proportion to the force of the side thrust and that side skidding may be very effectually checked.

The above described skidding action usually occurs at such times as the brakes of the vehicle are applied, to retard the forward movement of the vehicle and at which times the wheels and tires are locked, that is the cross chains are held in contact with the ground and do not move circumferentially of the tire, but are, of course, sufficiently loose to allow a transverse movement of the tire and cross chains.

It will be obvious that many changes and modifications may be made in the form of the invention without departing from the scope thereof.

What I claim is:

1. An anti-skid device for automobile tires comprising, a flexible ring member and a rigid ring member, one at each side of said tire, and flexible cross members connecting said ring members for loosely embracing the tread of the tire and being capable of a transverse shifting movement thereon, to move the ring into engagement with the roadway.

2. An anti-skid device for automobile tires comprising, a flexible ring member and a rigid annular member, one at each side of said tire, said annular member having a narrow outer periphery of smaller diameter than the tire, and flexible cross members connecting said ring members for loosely embracing the tread of the tire and being capable of a transverse shifting movement thereon.

3. An anti-skid device for automobile tires comprising, a flexible ring member and a rigid annular member, one at each side of said tire, said annular member being corrugated circumferentially and having an outer periphery of smaller diameter than the tire, and flexible cross members connecting said ring members for loosely embracing the tread of the tire and being capable of a transverse shifting movement thereon.

4. An anti-skid device for automobiles comprising, a flexible ring member and a rigid annular member, one at each side of said tire, and flexible cross members loosely embracing the tread of said tire that are connected to the inner periphery of said rigid annular member and arranged to shift transversely of the tire.

5. An anti-skid annular ring overlying a side of a tire provided with a roughened peripheral edge for engaging the roadway, a flexible side chain overlying the other side of said tire, transverse cross chains connected to the inner periphery of said ring and side chain that loosely engage the tread of said tire to permit a radial movement of said ring with relation to said tire and that normally support the ring at a distance from the roadway, all adapted and arranged so that a transverse movement of said tire and a cross chain will move the ring radially of the tire and bring the outer edge thereof into anti-skidding engagement with the roadway.

6. An anti-skid device for vehicle tires comprising in combination an annular ring member adapted to overlie a side of a tire that is provided with grooves in its outer peripheral edge and apertures adjacent its inner peripheral edge, a side chain adapted to overlie the other side of said tire, cross chains pivotally connected to the apertures of the ring and to the side chain, the said cross chains being adapted to loosely overlie the tire tread and in cooperation with the side chain to support the said ring concentrically to the tire and to permit a radial movement of the ring relative to the tire.

In testimony whereof I have affixed my signature.

JOSEPH D. BATES.